United States Patent [19]

Scheurer et al.

[11] Patent Number: 4,846,429
[45] Date of Patent: Jul. 11, 1989

[54] RELEASABLE SUCTION CUP ASSEMBLY

[75] Inventors: Robert S. Scheurer, Wichita Falls; I. D. Modisett, Jr., Roanoke, both of Tex.

[73] Assignee: Robert S. Scheurer, Wichita Falls, Tex.

[21] Appl. No.: 222,150

[22] Filed: Jul. 21, 1988

[51] Int. Cl.$^4$ ............................................. A47F 5/00
[52] U.S. Cl. ............................... 248/205.8; 248/309.3
[58] Field of Search ............... 248/206.2, 205.5, 205.6, 248/205.7, 205.8, 205.9, 309.3, 363

[56] References Cited

U.S. PATENT DOCUMENTS

| | | | |
|---|---|---|---|
| 1,751,463 | 2/1930 | Backus et al. | 248/205.5 X |
| 2,420,811 | 5/1947 | Brewster et al. | 248/205.8 X |
| 2,642,248 | 6/1953 | Semon | 248/206 |
| 3,020,017 | 2/1962 | Watson | 248/205.8 |
| 3,091,779 | 6/1963 | Lucas et al. | 4/185 |
| 3,101,566 | 8/1963 | Stiller | 45/28 |
| 3,101,567 | 8/1963 | Stiller | 45/28 |
| 3,310,267 | 3/1967 | Koehler | 248/205.5 X |
| 3,677,951 | 7/1972 | Alles | 252/92 |
| 4,043,531 | 8/1977 | Green | 248/205.8 X |
| 4,580,751 | 4/1986 | Panzer | 248/205.8 |
| 4,607,875 | 8/1986 | McGirr | 248/205.5 X |

Primary Examiner—Ramon O. Ramirez
Attorney, Agent, or Firm—Dennis T. Griggs

[57] ABSTRACT

A suction cup assembly has a vacuum release strap for detachment of the assembly from a recipient host surface on which the assembly is attached. The suction cup assembly includes a base adapted to be secured to an article to be supported, at least one flexible suction cup secured upright onto the base and a flexible release strap extending slack between the cup and the base. Tensioning of the strap causes a local deflection of the suction cup lip in a controlled direction from the recipient surface to release the vacuum holding force.

14 Claims, 3 Drawing Sheets

RELEASABLE SUCTION CUP ASSEMBLY

FIELD OF THE INVENTION

This invention relates to the art of suction holders.

BACKGROUND OF THE INVENTION

Suction cup assemblies are widely used for attachment and support of various items. In one construction, a base portion of the suction cup is permanently secured to an item while the suction cup provides a convenient form of attachment for temporary support of the item on a surface of choice. A suction cup may be used alone or in combination with other suction cup assemblies to effect a desired level of gripping force. Because the suction cup relies on vacuum force to maintain the attachment, release depends on dissipating or overcoming the vacuum grip. Failure to dissipate the vacuum grip prior to detachment has been known to tear or otherwise damage a frangible surface on which the suction cup or its base is mounted.

DESCRIPTION OF THE PRIOR ART

Suction cup assemblies for temporary support of items are available from a variety of commercial sources. Typically, the suction cup assemblies include a base that is permanently mounted onto a host surface by fasteners or adhesive. The cup itself is normally comprised of an elastomeric composition such as rubber or available forms of thermoplastic materials. The ability of the suction cup to grip a surface to which it is to be attached is dependent on establishing an airtight contact between the attachment surface and the cup flange in the course of dissipating air from the cup interior. Once an airtight seal is established, ambient pressure acting on the exterior of the cup flange maintains its attachment hold.

It is a common practice in sizing and selecting suction cup assemblies to utilize a cup with an excessive hold capacity affording a safety factor in assuring retention of the attachment for the weight to be supported. However, in circumstances where either the cup base or the cup is attached to a frangible surface, forced withdrawal of the cup assembly from its vacuum attachment can cause destruction of the frangible surface. Moreover, for certain applications such as beverage holders which are secured by a suction cup assembly, a hard pull on the beverage holder can cause the beverage to spill. In such instances, it is desirable that the suction cup assembly hold the beverage container tightly to the supporting surface, but be capable of easy release of the suction gripping force to prevent upsetting and spilling the beverage contents. Use of a vacuum release to aid in suction cup removal from its attachment is exemplified by the disclosures of U.S. Pat. Nos. 2,642,248 and 3,101,567. Typical suction cup constructions are disclosed in U.S. Pat. Nos. 3,101,566; 3,091,779; and 3,677,951.

OBJECTS OF THE INVENTION

It is therefore an object of the invention to provide an improved construction for a suction cup assembly having a vacuum release for effecting detachment.

Another object of the invention is to provide an improved vacuum release structure for a suction cup assembly to aid in removing an article being supported thereby.

It is yet another object of the invention to provide an improved, low cost vacuum release structure for a suction cup assembly affording simplified operation for release of its vacuum attachment.

SUMMARY OF THE INVENTION

This invention relates to suction cup assemblies. More specifically, the invention relates to suction cup assemblies having an improved low cost vacuum release structure that is simple to operate in dissipating the vacuum grip between the cup and its attached surface.

The foregoing objects are achieved in accordance with the invention by means of an elastomeric cup secured onto a thin planar base. Release of the vacuum grip is produced by a narrow, flexible strap which extends integrally between the base and the suction cup preferably on a selected peripheral surface location near the suction cup edge. In one embodiment, the strap includes a directional fold and is normally slacked so as not to interfere with a suction grip being imposed. At such time as the vacuum grip of the suction cup is to be released, a gentle tug or rotation on the supported item at a point that will take the slack out of the lifter strap will cause the cup edge to be drawn away from the attached surface, which in turn will dissipate the vacuum and cause the suction cup to release. A pull from any other direction will not release the cup except by exerting full force to forcibly remove the cup from its attached surface.

The above noted features and advantages of the invention as well as other superior aspects thereof will be further appreciated by those skilled in the art upon reading the detailed description which follows in conjunction with the drawings.

DESCRIPTION OF THE PREFERRED EMBODIMENTS

Figure 1:
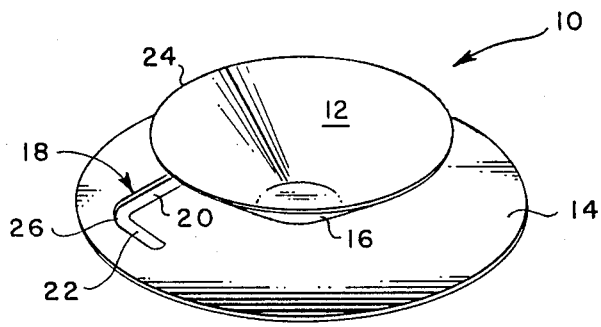
FIG. 1 is a top side perspective view of a suction cup assembly constructed in accordance with the invention.

In the description which follows, like parts are marked throughout the specification and drawings with the same reference numerals, respectively. The figures are not necessarily to scale and proportions of certain parts have been exaggerated for purposes of clarity.

Figure 2:
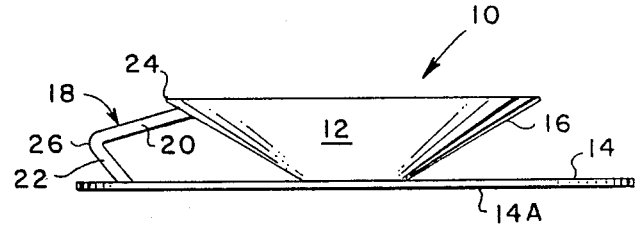
FIG. 2 is a side elevation view of the suction cup assembly of FIG. 1.
Figure 3:
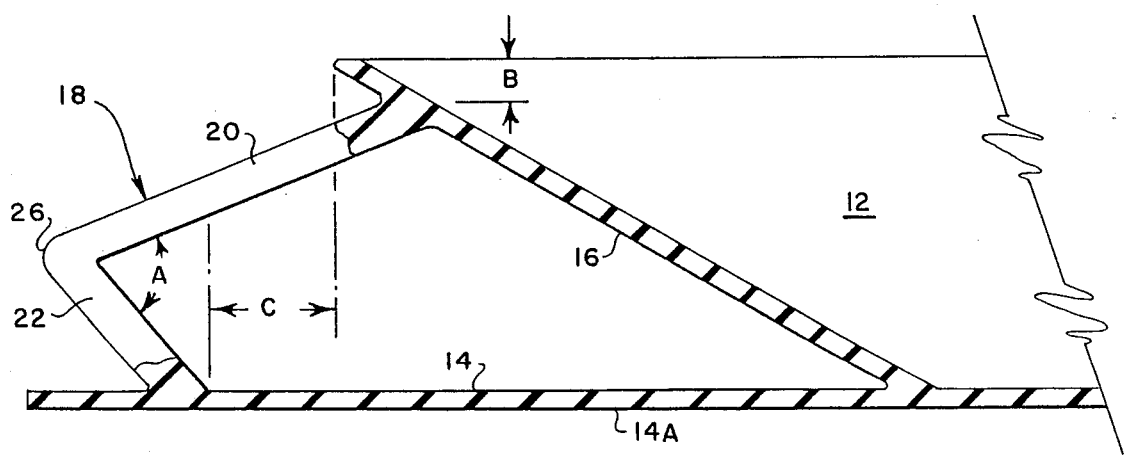
FIG. 3 is a fragmentary, partially sectioned, enlargement view of the vacuum release structure of the suction cup assembly of FIG. 1.

Referring to FIGS. 1-3, a suction cup assembly constructed according to a first embodiment of the present invention is designated 10 and includes a suction cup 12 secured to a planar flange base 14. The cup 12 has an annular frustoconical shell 16 extending upright from the base and integrally formed therewith. The undersurface 14A of base 14 is normally provided with an adhesive coating (not shown) or the base is heat sealed whereby it can be securely mounted in a permanent placement onto a recipient surface of choice. The entire assembly is preferably integrally formed of an injection moldable, flexible material such as vinyl plastic.

Figure 8:
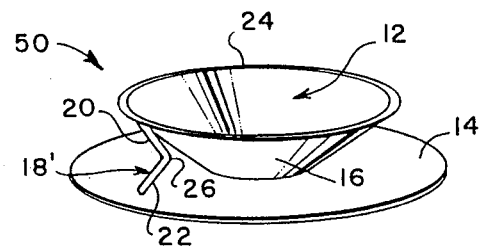
FIG. 8 is a top side perspective view of the suction cup assembly constructed in accordance with an alternate embodiment of the invention.
Figure 9:
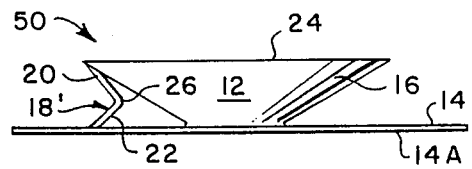
FIG. 9 is a side elevation view of the suction cup assembly of FIG. 8.
Figure 10:
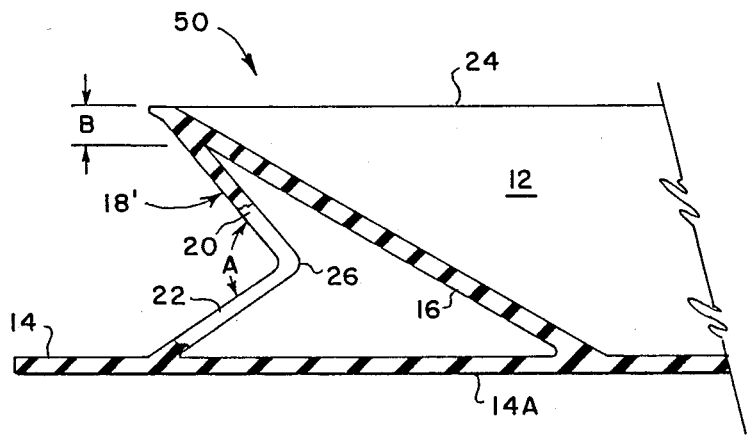
FIG. 10 is a fragmentary, partially sectioned, enlargement view of the vacuum release structure of the suction cup assembly shown in FIG. 8.

For releasing a suction force imposed by shell 16 against a surface on which it is attached, there is provided a vacuum release strap 18 having an upper leg 20 and a lower leg 22 extending slightly slacked in an outward fold integrally joined between shell 16 and base 14. In this embodiment, it is preferred that the fold of legs 20 and 22 form an acute internal angle A between their surfaces. Alternatively, an "S" or "U" configuration may be used to produce slack. A particular slack arrangement is effected by the joinder of leg 20 to shell 16 at a predetermined distance B below lip edge 24 and joining the lower leg 22 to base 14 at a predetermined radial distance C outward of suction cup lip 24. In the embodiment shown in FIG. 3, the fold of the strap produces a knee 26 at the apex of the angle A which projects radially outward from the suction cup 12. Alternatively, the fold can be reversed with the knee 26 projecting radially inwardly toward the cup 12 as illustrated in FIGS. 8, 9 and 10 as described below.

Figure 4:
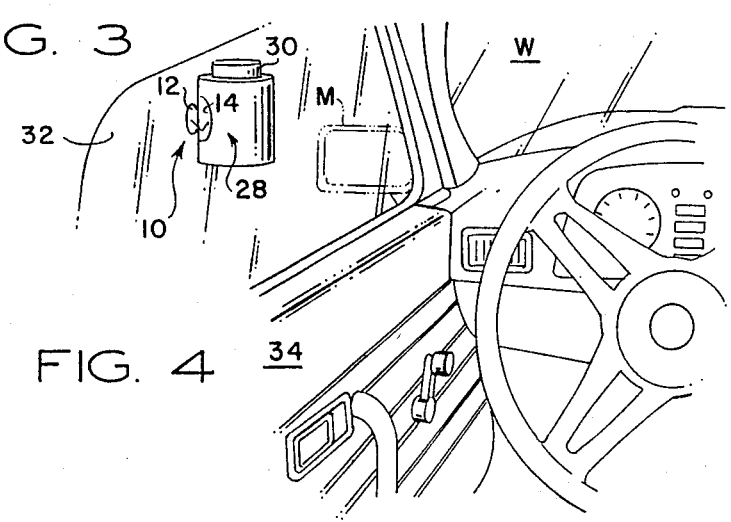
FIG. 4 is a perspective view of an automobile interior exemplifying a typical use of the suction cup assembly hereof.

Referring now to FIG. 4, the base 14 of suction cup assembly 10 hereof is secured to a portable insulated beverage cup holder 28 formed of a soft, frangible, thermally insulating composition in which a beverage can 30 is disposed. The suction cup 12 is mounted via a vacuum attachment onto the closed side window 32 of an automobile door 34. The selected mounting site should be sufficiently removed from the rear view mirror M to avoid any interference with the operator's line of sight. It will be appreciated that a strong suction grip is needed to avoid an inadvertent release of the beverage cup holder as the automobile door 34 is to opened and closed.

Figure 7:
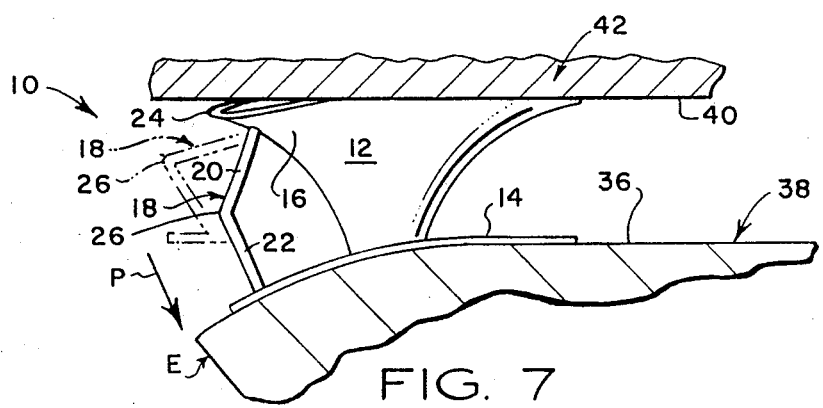
FIG. 7 is a fragmentary enlargement view demonstrating operation of the vacuum release hereof.

The thermally insulated beverage cup holder 28 has a soft, frangible external covering which is subject to tearing in response to a severe separating force applied to the base 14 relative to the surface of the cup holder 28. The base 14 may be thermally bonded or adhesively bonded to the surface of the insulating cup holder, with the cup holder material tending to tear along the peripheral interface between the base and the holder surface. That is, any attempt to remove the cup holder 28 from the window 32 by a pull force applied directly to the holder 28 would ordinarily cause the beverage holder to tear. Moreover, a hard pull on the holder 28 which is sufficient to release the suction grip will usually cause the beverage container to be upset and spill its contents. However, by deflecting the lip 24 locally as shown in FIG. 7 in response to tensioning of the strap 18, the suction grip is released and the holder can be removed without tearing, and without spilling the contents of the beverage container 30.

The foregoing embodiment may be used to good advantage in connection with any smooth non-porous surface on a boat, recreational vehicle, airplane, mobile home, and the like.

Figure 5:
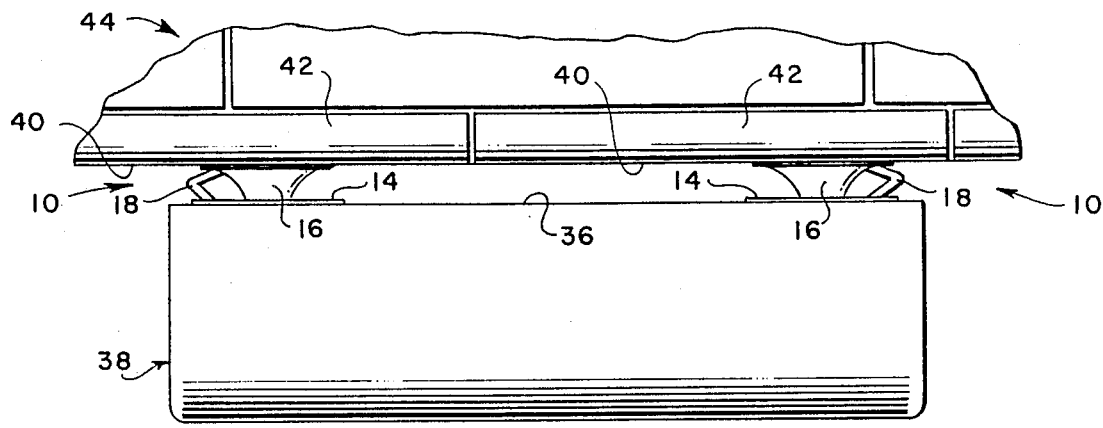
FIG. 5 is a fragmentary plan view of a water spa pillow exemplifying another use of the suction cup assembly hereof.
Figure 6:
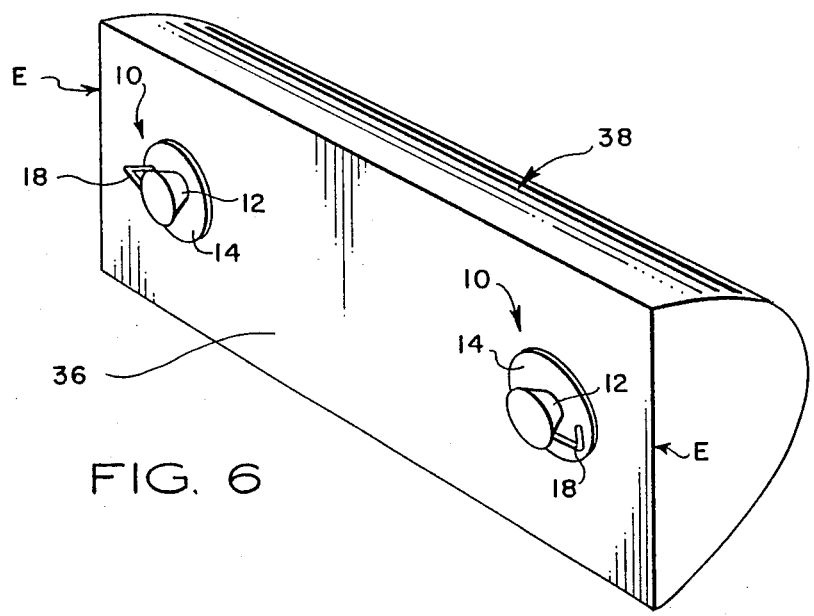
FIG. 6 is a rear perspective view of the spa pillow and suction cup combination of FIG. 5.

For the exemplary use illustrated in FIGS. 5 and 6, a pair of suction cup assemblies 10 have their bases 14 secured to frangible rear face 36 of a spa pillow 38. As best seen in FIG. 5, the shells 16 of suction cups 12 are mounted by vacuum attachment to the smooth vertical face 40 of a ceramic tile 42 which forms the sidewall of a spa 44. Like the beverage cup holder 28, the spa pillow 38 is assumed to be formed of a flexible, frangible composition and would normally be unable to withstand a separation force imposed on the pillow to forcibly release the cups 12 from the ceramic tile surface 40.

When it is desired that the supported item such as the bearing holder 28 or spa pillow 38 be detached from the recipient surface to which it is being vacuum held, release of suction cup vacuum is effected by exerting a pulling force onto an underlying portion E (FIG. 7) of the supported item which is directly beneath the release strap 18. That is, while an ordinary pull from any other direction will normally not break the vacuum seal effected between suction cup 12 and host surface, a light pull on the article being directed on a point directly below or adjoining the strap 18 will cause dissipation of the vacuum hold to occur. In order therefore to break the vacuum seal in accordance herewith, a locally light force is applied to an underlying end portion E of an attached article in the area of the strap 18 which renders the strap taut thereby pulling the lip 24 away from surface 40 as indicated by the arrow P. Once deflection occurs, the previously established vacuum hold is instantly relieved, and the suction cup is released from the host surface.

Referring now to FIGS. 8, 9 and 10, an alternative embodiment of the suction cup assembly is designated 50. In this embodiment, the strap 18' is formed with a reverse fold in which the knee 26 projects radially inwardly. Additionally, the leg 22 is attached to the base 14 substantially directly below the suction cup lip 24 as can best be seen in FIG. 10. In this embodiment, the attachment point of the lower leg 22 is preferably aligned with the orthographic projection of the lip 24 onto the base 14; however, the lower leg 22 can be attached radially inboard of the lip projection point, or radially outboard, for example as shown in FIG. 3, to produce varying levels of slack in the tension straps 18, 18'.

The construction of suction cup assembly 50 is otherwise identical to the construction of suction cup assembly 10. Release operation of suction cup assembly 50 is also identical to the release operation of suction cup assembly 10, with release being effected by tensioning the strap 18' as an underlying portion of the supported article is pulled away from the host surface as shown in FIG. 7.

Figure 11:
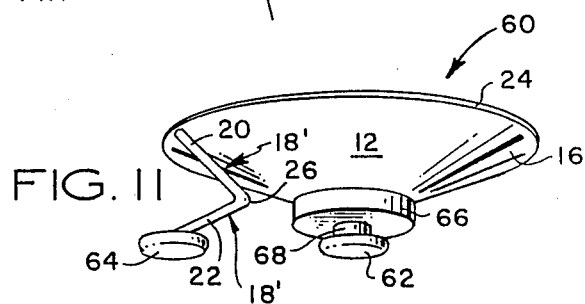
FIG. 11 is a bottom perspective view of the suction cup assembly constructed in accordance with yet another embodiment of the invention; and, FIG. 12 is a side elevation view, partly in section, of a typical use of the suction assembly shown in FIG. 11.
Figure 12:
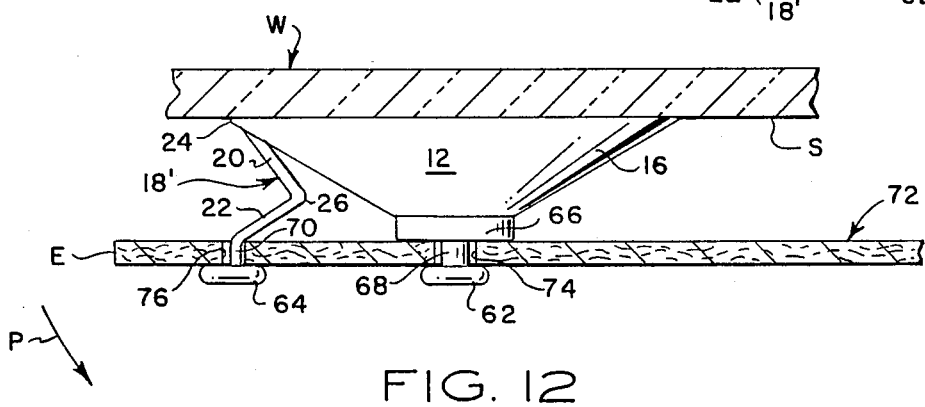

Referring now to FIGS. 11 and 12, yet another embodiment of the invention is represented by a suction cup assembly 60. In this embodiment, a common base 14 is not utilized. Instead, the suction cup 12 and the tension strap 18' are independently mounted and fastened onto an article to be supported by anchor buttons 62, 64, respectively.

The suction cup assembly 60, together with the anchor buttons 62, 64 are preferably molded together as an integral assembly. In this arrangement, the suction cup 12 has an abbreviated base 66 which is joined to the anchor button 62 by an arm 68. Likewise, the anchor button 64 is joined to the tension strap 18' by an arm 70.

As shown in FIG. 11, the tension strap 18' is freely movable with respect to the abbreviated base 66. The abbreviated base 66 is substantially smaller in diameter relative to base 14, and its diameter may be substantially the same as arm 68, if desired.

The suction cup assembly 60 as illustrated in FIGS. 11 and 12 is particularly well suited for retaining a cardboard sun shield 72 adjacent the inside surface S of a glass automobile windshield W. In this arrangement, the cardboard sun shield 72 is perforated to produce small openings 74, 76 for receiving the anchor buttons 62, 64, respectively as shown in FIG. 12. After the buttons 62, 64 have been forced through the fastener openings 74, 76, the suction cup assembly 60 is securely retained against the surface S of glass windshield W, thus supporting the sun shield 72 in a desired location adjacent the windshield W. When it is desired to remove the sun shield 72, the end portion E of the sun shield 72 underlying the tension strap 18' is pulled away from the windshield W which pulls the slack out of the folded strap 18'. As tension is induced within the strap 18', the suction cup lip 24 is deflected away from the surface S of the windshield W, thereby relieving the vacuum grip applied by the shell 16 of the suction cup 12.

In the foregoing description, there are disclosed alternative embodiments of an improved suction cup assembly capable of imposing a strong level of suction grip onto a host surface and which can be released quickly without damaging the host surface. By virtue of the novel vacuum release structure forming an integral part of the suction cup assembly, a normally directed light force applied to the article being held in the area adjacent to the pull strap is sufficient to deflect the lip of the suction cup and release the vacuum grip.

It will be appreciated that the foregoing suction cup deflection can be carried out repeatedly to release the vacuum grip imposed by a suction cup without damaging the underlying support material. Not only does such a release aid in detaching the vacuum secured articles, but at the same time it enhances the versatility of the suction cup by permitting it to be used with frangible materials otherwise vulnerable to damage in the course of detaching one from the other. Despite the simplicity and effectiveness by which the release strap is operative, it is evident that it is an inexpensive improvement which substantially extends the useful life and utility of the suction cup/product combination. Whereas the suction cup assembly of the invention has been described in relation with the base attached to an article to be supported and the suction cup attached to a recipient mounting surface, it will be appreciated this relation could be reversed.

Since many changes could be made in the above constructions and many apparently widely different embodiments of this invention could be made without departing from the scope thereof, it is intended that all matter contained in the drawings and specification shall be interpreted as illustrative and not in a limiting sense.

What is claimed is:

1. A suction cup assembly comprising:
   a base;
   a suction cup of flexible composition secured onto said base; and,
   a strap having a first end portion secured to said suction cup and a second end portion secured to said base.

2. A suction cup assembly as defined in claim 1 in which said suction cup has a lip and said strap is secured to said cup in the vicinity of said lip and said strap when tensioned is effective to deflect said lip.

3. A suction cup assembly as defined in claim 1 in which said strap when tensioned is effective to impose a local withdrawal force on the sidewall of said suction cup, said withdrawal force being directed generally normal to the plane of a host surface.

4. A suction cup assembly as defined in claim 1 in which said strap has leg portions defining a partial fold intermediate said end portions.

5. A suction cup assembly as defined in claim 4 in which said partial fold defines an "S" configuration.

6. A suction cup assembly as defined in claim 1 in which said strap includes first and second leg portions intermediate said end portions, said leg portions being folded about a knee, said knee projecting laterally relative to said suction cup.

7. A suction cup assembly as defined in claim 6 in which said knee projects inwardly toward said suction cup.

8. A suction cup assembly as defined in claim 6 in which said knee projects outwardly away from said suction cup.

9. In combination:
   a suction cup assembly including a suction cup of flexible composition and adapted for unassisted vacuum hold onto a recipient host surface to which the suction cup is to be attached, and an anchor button attached to said cup;
   a release strap attached to said suction cup and effective when tensioned to dissipate the force of the vacuum hold for enabling removal of said suction cup from the host surface, said release strap having a freely movable end portion and an anchor button attached to said freely movable end portion; and,
   an article to be supported by said suction cup assembly, said article having first and second perforations through which said suction cup anchor button and said release strap anchor button are inserted, respectively, said suction cup anchor button retaining said suction cup against said article to be supported, and said release strap anchor button engaging said article to be supported and retaining said release strap against said article to be supported as said article to be supported is pulled away from the recipient host surface.

10. The combination as defined in claim 9, wherein the recipient host surface is an automobile windshield, and the article to be supported is a sun shield.

11. A suction cup assembly comprising:
    a base;
    a suction cup of flexible composition secured onto said base;
    an anchor button; and,
    an arm attached to said anchor button and to said suction cup.

12. A suction cup assembly as defined in claim 11,
    said arm being a flexible strap extending from said suction cup and having a freely movable end portion; and, said anchor button being attached to said freely movable end portion of said flexible strap.

13. A suction cup assembly as defined in claim 11, including an anchor button secured to said base.

14. A releasable suction cup assembly comprising, in combination:

a suction cup having a flexible sidewall adapted for suction engagement against a host surface; and, a release strap attached to said flexible sidewall, said release strap being adapted for attachment to an article to be supported adjacent to the host surface and operable to deflect said sidewall away from the host surface in response to displacement of said article relative to the host surface.

* * * * *